US011407875B2

(12) United States Patent
Hu et al.

(10) Patent No.: US 11,407,875 B2
(45) Date of Patent: Aug. 9, 2022

(54) PROCESS FOR PRODUCING FOAM BEADS USING A MODIFIED ETHYLENE-BASED POLYMER

(71) Applicant: Dow Global Technologies LLC, Midland, MI (US)

(72) Inventors: Xiaolian Hu, Shanghai (CN); Haiyang Yu, Shanghai (CN); Hongyu Chen, Zhangjiang (CN); Yonghua Gong, Shanghai (CN); Yi Zhang, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 50 days.

(21) Appl. No.: 16/641,460

(22) PCT Filed: Aug. 29, 2018

(86) PCT No.: PCT/US2018/048531
§ 371 (c)(1),
(2) Date: Feb. 24, 2020

(87) PCT Pub. No.: WO2019/046418
PCT Pub. Date: Mar. 7, 2019

(65) Prior Publication Data
US 2020/0199320 A1 Jun. 25, 2020

(30) Foreign Application Priority Data
Aug. 31, 2017 (WO) ............. PCT/CN2017/099874

(51) Int. Cl.
*C08J 9/18* (2006.01)
*C08F 297/08* (2006.01)
*C08J 9/00* (2006.01)
*C08J 9/12* (2006.01)
*C08L 53/00* (2006.01)

(52) U.S. Cl.
CPC ............ *C08J 9/18* (2013.01); *C08F 297/086* (2013.01); *C08J 9/0061* (2013.01); *C08J 9/122* (2013.01); *C08L 53/005* (2013.01); *C08F 2810/00* (2013.01); *C08J 2203/02* (2013.01); *C08J 2203/08* (2013.01); *C08J 2353/00* (2013.01); *C08J 2423/30* (2013.01); *C08J 2453/00* (2013.01); *C08L 2203/14* (2013.01); *C08L 2205/025* (2013.01); *C08L 2207/066* (2013.01)

(58) Field of Classification Search
CPC ........................................................ C08J 9/18
See application file for complete search history.

(56) References Cited

U.S. PATENT DOCUMENTS

| 5,552,448 A | 9/1996 | Kobayashi et al. |
| 5,605,937 A | 2/1997 | Knaus |
| 5,639,818 A * | 6/1997 | Lee .......... C08L 23/10 524/515 |
| 5,763,498 A | 6/1998 | Knaus |
| 6,103,833 A * | 8/2000 | Hogt .......... C08F 8/50 525/333.8 |
| 7,608,668 B2 | 10/2009 | Li Pi Shan et al. |
| 7,666,918 B2 | 2/2010 | Prieto et al. |
| 2002/0115796 A1* | 8/2002 | Walton .......... C08L 23/0815 525/240 |
| 2006/0047076 A1 | 3/2006 | Scheie |
| 2006/0116434 A1* | 6/2006 | Sasaki .......... C08J 9/18 521/142 |
| 2006/0199914 A1* | 9/2006 | Harris .......... C08F 297/086 525/242 |
| 2015/0166779 A1* | 6/2015 | Diehl .......... C08L 23/142 524/528 |
| 2016/0237222 A1* | 8/2016 | Demirors .......... C08L 23/0815 |
| 2018/0127559 A1 | 5/2018 | Takagi et al. |

FOREIGN PATENT DOCUMENTS

| JP | 2013064137 | * | 4/2013 |
| WO | 2016/030026 A1 | | 3/2016 |
| WO | 2016/032715 A1 | | 3/2016 |
| WO | 2017/091996 A1 | | 6/2017 |

OTHER PUBLICATIONS

LDPE LD 100 flyer (Year: 2013).*

* cited by examiner

*Primary Examiner* — Irina Krylova
(74) *Attorney, Agent, or Firm* — Quarles & Brady LLP

(57) ABSTRACT

The present disclosure provides a process. The process includes (i) forming a composition containing a peroxide-modified ethylene-based polymer selected from the group consisting of a peroxide-modified ethylene/α-olefin multi-block copolymer, a peroxide-modified low density polyethylene, and combinations thereof; (ii) contacting the composition with a blowing agent to form a foam composition; and (iii) forming foam beads comprising the foam composition. The present disclosure also provides a foam bead produced by said process.

6 Claims, No Drawings

PROCESS FOR PRODUCING FOAM BEADS USING A MODIFIED ETHYLENE-BASED POLYMER

BACKGROUND

The present disclosure relates to ethylene-based polymer foams, also known as polyethylene foams.

Polyethylene foams are utilized in footwear components, such as midsole applications. Crosslinked ethylene-based polymers including ethylene vinyl acetate (EVA) copolymer and polyolefin elastomers have traditionally dominated the polyethylene foam market in footwear as they can easily be foamed with a chemical blowing agent. However, chemical blowing agents are known to produce unpleasant odors and contaminate molds.

Furthermore, crosslinked ethylene-based polymer foams are not recyclable because they are thermoset (rather than thermoplastic). Additionally, crosslinked ethylene-based polymer foam beads cannot be fused together to form a uniform article, such as a foam midsole. Consequently, crosslinked ethylene-based polymer foams are not traditionally prepared using a foam bead process, which utilizes a physical blowing agent.

The art recognizes the need for a process of forming ethylene-based foam beads that exhibit suitable density for foam sole and foam midsole applications. The art also recognizes the need for a process of forming ethylene-based foam beads that are not crosslinked.

The art recognizes the need for an ethylene-based foam bead formed from a composition with a suitable melt strength for foam applications, wherein the foam bead exhibits suitable density for foam applications, and is not crosslinked.

SUMMARY

The present disclosure provides a process. The process includes (i) forming a composition containing a peroxide-modified ethylene-based polymer selected from the group consisting of a peroxide-modified ethylene/α-olefin multi-block copolymer, a peroxide-modified low density polyethylene, and combinations thereof; (ii) contacting the composition with a blowing agent to form a foam composition; and (iii) forming foam beads comprising the foam composition.

The present disclosure also provides a foam bead. The foam bead contains a composition containing a peroxide-modified ethylene-based polymer selected from the group consisting of a peroxide-modified ethylene/α-olefin multi-block copolymer, a peroxide-modified low density polyethylene, and combinations thereof. The composition has (a) a melt strength from 9 cN to 30 cN and (b) a gel content of 0%. The foam bead has a foam density of less than 0.300 g/cc.

DEFINITIONS

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1 or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "block copolymer" or "segmented copolymer" refers to a polymer comprising two or more chemically distinct regions or segments (referred to as "blocks") joined in a linear manner, that is, a polymer comprising chemically differentiated units which are joined (covalently bonded) end-to-end with respect to polymerized functionality, rather than in pendent or grafted fashion. In an embodiment, the blocks differ in the amount or type of comonomer incorporated therein, the density, the amount of crystallinity, the type of crystallinity (e.g. polyethylene versus polypropylene), the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers are characterized by unique distributions of both polymer polydispersity (PDI or Mw/Mn) and block length distribution, due to the effect of shuttling agent(s) in combination with the catalyst(s) employed in their preparation.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α-olefin multi-block copolymers (also known as olefin block copolymer (OBC)), single-site catalyzed linear low density polyethylene (m-LLDPE), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer. Ethylene plastomers/elastomers have a density from 0.870 g/cc to 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

A "nucleator" or "nucleating agent" is a substance, typically a small particle, that provides a nucleation site or location for bubble formation within a polymer melt. Nucleating agents are used to enhance the cell structure of foamed polymers.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin comonomer. LLDPE is characterized by little, if any, long chain branching, in contrast to conventional LDPE. LLDPE has a density from 0.910 g/cc to less than 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

"Long-chain branching" or "LCB" is a chain length that exceeds that of a short chain that results from incorporation of an alpha-olefin into the backbone of an ethylene/α-olefin polymer.

"Low density polyethylene" (or "LDPE") consists of ethylene homopolymer, or ethylene/α-olefin copolymer comprising at least one $C_3$-$C_{10}$ α-olefin that has a density from 0.915 g/cc to less than 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

An "olefin-based polymer" or "polyolefin" is a polymer that contains more than 50 weight percent polymerized olefin monomer (based on total amount of polymerizable monomers), and optionally, may contain at least one comonomer. A nonlimiting examples of an olefin-based polymer is ethylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably.

"Sintering" is a process of compacting and forming a mass of fused foam beads by heat and/or pressure into an article, without melting the beads to the point of liquefaction.

TEST METHODS

Density is measured in accordance with ASTM D792, Method B. The result is recorded in grams per cubic centimeter (g/cc).

Foam density is measured in accordance with ASTM D792-00 involving weighing polymer foam in water using a sinker. The result is recorded in g/cc.

Gel content is measured by extraction in boiling decalin at 180° C. for 5 hours according to ASTM 2765. The result is recorded in percent (%), based on the total weight of the material. The percent gel normally increases with increasing crosslinking levels.

Long chain branching (LCB) is determined by conventional techniques known in the industry, such as $^{13}$C nuclear magnetic resonance ($^{13}$C NMR) spectroscopy, using, for example, the method of James C. Randall, *A Review of High Resolution Liquid $^{13}$Carbon Nuclear Magnetic Resonance Characterizations of Ethylene-Based Polymers*, C29, J. Macromolecular Science, Polymer Revs. 201, 285-297 (1989). Two other methods are gel permeation chromatography, coupled with a low angle laser light scattering detector (GPC-LALLS), and gel permeation chromatography coupled with a differential viscometer detector (GPC-DV). The use of these techniques for long chain branch detection, and the underlying theories, have been well documented in the literature. See, for example, Bruno H. Zimm & Walter H. Stockmayer, *The Dimensions of Chain Molecules Containing Branches and Rings*, 17 J. Chemical Physics 1301 (1949) and Alfred Rudin, *Measurement of Long-Chain Branch Frequency in Synthetic Polymers, in Modern Methods of Polymer Characterization* 103, 103-112 (Howard G. Barth & Jimmy W. Mays eds. 1991).

Melt index (MI) (I2) in g/10 min is measured in accordance with ASTM D1238 (190° C./2.16 kg). The result is reported in grams eluted per 10 minutes (g/10 min).

"Shear Viscosity" refers to the viscosity of a composition under a certain shear rate. Shear viscosity is measured using a rubber processing analyzer (RPA, Model: 2000P at 130° C. with 7% strain, and a frequency sweep of 1 radian/second and a frequency sweep of 100 radians/second.

Melt Strength

Melt strength measurements are conducted on a Gottfert Rheotens 71.97 (Göettfert Inc.; Rock Hill, S.C.) attached to a Gottfert Rheograph 25 capillary rheometer. A polymer melt is extruded through a capillary die with a flat entrance angle (180 degrees) with a capillary diameter of 2.0 mm and an aspect ratio (capillary length/capillary diameter) of 15.

After equilibrating the samples at 190° C. for 10 minutes, the piston is run at a constant piston speed of 0.200 mm/second. The standard test temperature is 190° C. The sample is drawn uniaxially to a set of accelerating nips located 100 mm below the die with an acceleration of 6.0 mm/sec$^2$. The tensile force is recorded as a function of the take-up speed of the nip rolls. Melt strength is reported as the plateau force (mN) before the strand breaks. The following conditions are used in the melt strength measurements: piston speed=0.200 mm/sec; start speed=30 mm/s; wheel acceleration=6.0 mm/sec$^2$; capillary diameter=2.0 mm; capillary length=30 mm; barrel diameter=12 mm; and the gap of the wheel=0.3 mm.

Differential Scanning Calorimetry (DSC)

Differential Scanning calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion ($H_f$) (in Joules per gram), and the calculated % crystallinity for polyethylene samples using the following Equation: % Crystallinity=$((H_f)/292$ J/g$)\times 100$ The heat of fusion ($H_f$) (also known as melt enthalpy) and the peak melting temperature are reported from the second heat curve. Peak crystallization temperature is determined from the cooling curve.

Melting point, Tm, is determined from the DSC heating curve by first drawing the baseline between the start and end of the melting transition. A tangent line is then drawn to the data on the low temperature side of the melting peak. Where this line intersects the baseline is the extrapolated onset of melting (Tm). This is as described in Bernhard Wunderlich, *The Basis of Thermal Analysis, in Thermal Characterization of Polymeric Materials* 92, 277-278 (Edith A. Turi ed., 2d ed. 1997).

Crystallization temperature, Tc, is determined from a DSC cooling curve as above except the tangent line is drawn on the high temperature side of the crystallization peak. Where this tangent intersects the baseline is the extrapolated onset of crystallization (Tc).

DETAILED DESCRIPTION

The present disclosure provides a process. The process includes (i) forming a composition containing a peroxide-modified ethylene-based polymer selected from a peroxide-modified ethylene/α-olefin multi-block copolymer, a peroxide-modified low density polyethylene, and combinations thereof; (ii) contacting the composition with a blowing agent to form a foam composition; and (iii) forming foam beads containing the foam composition.

i. Forming a Composition

The process includes the step of forming a composition containing (A) a peroxide-modified ethylene-based polymer selected from a peroxide-modified ethylene/α-olefin multi-block copolymer, a peroxide-modified low density polyethylene, and combinations thereof; (B) optionally, an ethylene/α-olefin multi-block copolymer; and (C) optionally, an additive.

A. Peroxide-Modified Ethylene-Based Polymer

The present composition includes a peroxide-modified ethylene-based polymer selected from a peroxide-modified ethylene/α-olefin multi-block copolymer, a peroxide-modified low density polyethylene, and combinations thereof. A "peroxide-modified ethylene-based polymer" is an ethylene-based polymer that has been melt blended with a peroxide such that the peroxide acts as a rheology modifying agent in such a way (i) that the degree of long chain branching (LCB) in the peroxide-modified ethylene-based polymer is greater than the degree of LCB in the base ethylene-based polymer prior to peroxide modification, but (ii) the addition of peroxide does not induce crosslinking, as evidenced by the peroxide-modified ethylene-based polymer having a gel content of 0%. In other words, the peroxide-modified ethylene-based polymer is a thermoplastic that is still melt processable (and it not thermoset). A nonlimiting example of a suitable melt blending process is an extrusion process. The base ethylene-based polymer is an ethylene/α-olefin multi-block copolymer or a LDPE, as described in detail below.

Nonlimiting examples of suitable peroxides include bis (t-butylperoxy) diisopropylbenzene (BIBP), dialkyl peroxide, and combinations thereof. Nonlimiting examples of suitable dialkyl peroxides include dicumyl peroxide; di-t-butyl peroxide; t-butyl cumyl peroxide; 2,5-dimethyl-2,5-di (tert-butylperoxy)-hexane; 2,5-dimethyl-2,5-di(tert-amylperoxy)-hexane; 2,5-dimethyl-2,5-di(tert-butylperoxy) hexyne-3,2,5-dimethyl-2,5-di(tert-amylpero-xy)hexyne-3; α,α-di[(tert-butylperoxy)-isopropyl]-benzene; di-t-amyl peroxide (DTAP); 1,3,5-tri-[(tert-butylperoxy)-isopropyl] benzene; 1,3-dimethyl-3-(tert-butylperoxy)butanol; 1,3-dimethyl-3-(tert-amylperoxy) butanol; and combinations thereof. In an embodiment, the peroxide is BIBP.

In an embodiment, the peroxide-modified ethylene-based polymer is formed by melt blending from 99.85 wt %, or 99.88 wt % or 99.90 wt % to 99.95 wt %, or 99.96 wt %, or 99.99 wt % base ethylene-based polymer and from 0.01 wt %, or 0.04 wt %, or 0.05 wt % to 0.10 wt %, or 0.12 wt %, or 0.15 wt % peroxide, based on the combined amount of base ethylene-based polymer and peroxide. Nonlimiting examples of suitable melt blending processes include (i) extrusion and (ii) mixing at a temperature at or above the melting temperature of the base ethylene-based polymer.

In an embodiment, all, or substantially all, of the peroxide reacts with the base ethylene-based polymer during melt blending at a temperature higher than the peroxide's decomposition temperature (1 minute half-life) such that the peroxide-modified ethylene-based polymer contains 0 wt %, or from 0 wt % to less than 0.01 wt % peroxide.

1. Peroxide-Modified Ethylene/α-Olefin Multi-Block Copolymer

In an embodiment, the composition contains a peroxide-modified ethylene/α-olefin multi-block copolymer. A "peroxide-modified ethylene/α-olefin multi-block copolymer" is an ethylene/α-olefin multi-block copolymer that has been melt blended with a peroxide such that the peroxide acts as a rheology modifying agent in such a way (i) that the degree of LCB in the peroxide-modified ethylene/α-olefin multi-block copolymer is greater than the degree of LCB in the base ethylene/α-olefin multi-block copolymer prior to peroxide modification, but (ii) the addition of peroxide does not induce crosslinking, as evidenced by the peroxide-modified ethylene/α-olefin multi-block copolymer having a gel content of 0%.

The base ethylene/α-olefin multi-block copolymer is an ethylene/α-olefin multi-block copolymer. The term "ethylene/α-olefin multi-block copolymer" refers to an ethylene/C4-C8 α-olefin multi-block copolymer consisting of ethylene and one copolymerizable C4-C8 α-olefin comonomer in polymerized form (and optional additives), the polymer characterized by multiple blocks or segments of two polymerized monomer units differing in chemical or physical properties, the blocks joined (or covalently bonded) in a linear manner, that is, a polymer comprising chemically differentiated units which are joined end-to-end with respect to polymerized ethylenic functionality. Ethylene/α-olefin multi-block copolymer includes block copolymer with two blocks (di-block) and more than two blocks (multi-block). The C4-C8 α-olefin is selected from butene, hexene, and octene. The ethylene/α-olefin multi-block copolymer is void of, or otherwise excludes, styrene (i.e., is styrene-free), and/or vinyl aromatic monomer, and/or conjugated diene. When referring to amounts of "ethylene" or "comonomer" in the copolymer, it is understood that this refers to polymerized units thereof. In some embodiments, the ethylene/α-olefin multi-block copolymer can be represented by the following formula: (AB)n; where n is at least 1, preferably an integer greater than 1, such as 2, 3, 4, 5, 10, 15, 20, 30, 40, 50, 60, 70, 80, 90, 100, or higher, "A" represents a hard block or segment, and "B" represents a soft block or segment. The As and Bs are linked, or covalently bonded, in a substantially linear fashion, or in a linear manner, as opposed to a substantially branched or substantially star-shaped fashion. In other embodiments, A blocks and B blocks are randomly distributed along the polymer chain. In other words, the block copolymers usually do not have a structure as follows: AAA-AA-BBB-BB. In an embodiment, the ethylene/α-olefin multi-block copolymer does not have a third type of block, which comprises different comonomer(s). In another embodiment, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

Preferably, ethylene comprises the majority mole fraction of the whole ethylene/α-olefin multi-block copolymer, i.e., ethylene comprises at least 50 wt % of the whole ethylene/α-olefin multi-block copolymer. More preferably, ethylene comprises at least 60 wt %, at least 70 wt %, or at least 80 wt %, with the substantial remainder of the whole ethylene/α-olefin multi-block copolymer comprising the $C_4$-$C_8$ α-olefin comonomer. In an embodiment, the ethylene/α-olefin multi-block copolymer contains 50 wt % to 90 wt % ethylene, or 60 wt % to 85 wt % ethylene, or 65 wt % to 80 wt % ethylene. For many ethylene/octene multi-block copolymers, the composition comprises an ethylene content greater than 80 wt % of the whole ethylene/octene multi-block copolymer and an octene content of from 10 wt % to 15 wt %, or from 15 wt % to 20 wt % of the whole multi-block copolymer.

The ethylene/α-olefin multi-block copolymer includes various amounts of "hard" segments and "soft" segments. "Hard" segments are blocks of polymerized units in which ethylene is present in an amount greater than 90 wt %, or 95 wt %, or greater than 95 wt %, or greater than 98 wt %, based on the weight of the polymer, up to 100 wt %. In other words, the comonomer content (content of monomers other than ethylene) in the hard segments is less than 10 wt %, or 5 wt %, or less than 5 wt %, or less than 2 wt %, based on the weight of the polymer, and can be as low as zero. In some embodiments, the hard segments include all, or substantially all, units derived from ethylene. "Soft" segments are blocks of polymerized units in which the comonomer content (content of monomers other than ethylene) is greater than 5 wt %, or greater than 8 wt %, greater than 10 wt %, or greater than 15 wt %, based on the weight of the polymer. In an embodiment, the comonomer content in the soft segments is greater than 20 wt %, greater than 25 wt %, greater than 30 wt %, greater than 35 wt %, greater than 40 wt %, greater than 45 wt %, greater than 50 wt %, or greater than 60 wt % and can be up to 100 wt %.

The soft segments can be present in an ethylene/α-olefin multi-block copolymer from 1 wt % to 99 wt % of the total weight of the ethylene/α-olefin multi-block copolymer, or from 5 wt % to 95 wt %, from 10 wt % to 90 wt %, from 15 wt % to 85 wt %, from 20 wt % to 80 wt %, from 25 wt % to 75 wt %, from 30 wt % to 70 wt %, from 35 wt % to 65 wt %, from 40 wt % to 60 wt %, or from 45 wt % to 55 wt % of the total weight of the ethylene/α-olefin multi-block copolymer. Conversely, the hard segments can be present in similar ranges. The soft segment weight percentage and the hard segment weight percentage can be calculated based on data obtained from DSC or NMR. Such methods and calculations are disclosed in, for example, U.S. Pat. No. 7,608,668, entitled "Ethylene/α-Olefin Block Inter-Polymers," filed on Mar. 15, 2006, in the name of Colin L. P. Shan, Lonnie Hazlitt, et. al. and assigned to Dow Global Technologies Inc., the disclosure of which is incorporated by reference herein in its entirety. In particular, hard and soft segment weight percentages and comonomer content may be determined as described in column 57 to column 63 of U.S. Pat. No. 7,608,668.

The ethylene/α-olefin multi-block copolymer comprises two or more chemically distinct regions or segments (referred to as "blocks") joined (or covalently bonded) in a linear manner, that is, it contains chemically differentiated units which are joined end-to-end with respect to polymerized ethylenic functionality, rather than in pendent or grafted fashion. In an embodiment, the blocks differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Compared to block interpolymers of the prior art, including interpolymers produced by sequential monomer addition, fluxional catalysts, or anionic polymerization techniques, the present ethylene/α-olefin multi-block copolymer is characterized by unique distributions of both polymer polydispersity (PDI or Mw/Mn or MWD), polydisperse block length distribution, and/or polydisperse block number distribution, due, in an embodiment, to the effect of the shuttling agent(s) in combination with multiple catalysts used in their preparation.

In an embodiment, the ethylene/α-olefin multi-block copolymer is produced in a continuous process and possesses a polydispersity index (Mw/Mn) from 1.7 to 3.5, or from 1.8 to 3, or from 1.8 to 2.5, or from 1.8 to 2.2. When produced in a batch or semi-batch process, the ethylene/α-olefin multi-block copolymer possesses Mw/Mn from 1.0 to 3.5, or from 1.3 to 3, or from 1.4 to 2.5, or from 1.4 to 2.

In addition, the ethylene/α-olefin multi-block copolymer possesses a PDI (or Mw/Mn) fitting a Schultz-Flory distribution rather than a Poisson distribution. The present ethylene/α-olefin multi-block copolymer has both a polydisperse block distribution as well as a polydisperse distribution of block sizes. This results in the formation of polymer products having improved and distinguishable physical properties. The theoretical benefits of a polydisperse block distribution have been previously modeled and discussed in Potemkin, *Physical Review E* (1998) 57 (6), pp. 6902-6912, and Dobrynin, *J. Chem. Phys.* (1997) 107 (21), pp 9234-9238.

In an embodiment, the present ethylene/α-olefin multi-block copolymer possesses a most probable distribution of block lengths.

In a further embodiment, the ethylene/α-olefin multi-block copolymer of the present disclosure, especially those made in a continuous, solution polymerization reactor, possess a most probable distribution of block lengths. In one embodiment of this disclosure, ethylene/α-olefin multi-block copolymers are defined as having:

(A) Mw/Mn from about 1.7 to about 3.5, at least one melting point, Tm, in degrees Celsius, and a density, d, in grams/cubic centimeter, where in the numerical values of Tm and d correspond to the relationship:

$$Tm > -2002.9 + 4538.5(d) - 2422.2(d)^2, \text{ and/or}$$

(B) Mw/Mn from about 1.7 to about 3.5, and is characterized by a heat of fusion, ΔH in J/g, and a delta quantity, ΔT, in degrees Celsius defined as the temperature difference between the tallest DSC peak and the tallest Crystallization Analysis Fractionation ("CRYSTAF") peak, wherein the numerical values of ΔT and ΔH have the following relationships:

$$\Delta T > -0.1299 \Delta H + 62.81 \text{ for } \Delta H \text{ greater than zero and up to 130 J/g}$$

$$\Delta T \geq 48° \text{ C. for } \Delta H \text{ greater than 130 J/g}$$

wherein the CRYSTAF peak is determined using at least 5 percent of the cumulative polymer, and if less than 5 percent of the polymer has an identifiable CRYSTAF peak, then the CRYSTAF temperature is 30° C.; and/or (C) elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of crosslinked phase:

$$Re > 1481 - 1629(d); \text{ and/or}$$

(D) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density and molar comonomer content (based on the whole polymer) within 10 percent of that of the ethylene/α-olefin interpolymer; and/or (E) has a storage modulus at 25° C., G'(25° C.), and a storage modulus at 100° C., G'(100° C.), wherein the ratio of G'(25° C.) to G'(100° C.) is in the range of 1:1 to 9:1.

The ethylene/α-olefin multi-block copolymer may also have:

(F) a molecular fraction which elutes between 40° C. and 130° C. when fractionated using TREF, characterized in that the fraction has a block index of at least 0.5 and up to 1 and a molecular weight distribution, Mw/Mn, greater than 1.3; and/or (G) average block index greater than zero and up to 1.0 and a molecular weight distribution, Mw/Mn greater than 1.3.

It is understood that the ethylene/α-olefin multi-block copolymer may have one, some, all, or any combination of properties (A)-(G). Block Index can be determined as described in detail in U.S. Pat. No. 7,608,668 herein incorporated by reference for that purpose. Analytical methods for determining properties (A) through (G) are disclosed in, for example, U.S. Pat. No. 7,608,668, col. 31 line 26 through col. 35 line 44, which is herein incorporated by reference for that purpose.

In an embodiment, the ethylene/α-olefin multi-block copolymer has hard segments and soft segments, is styrene-free, consists of only (i) ethylene and (ii) a $C_4$-$C_8$ α-olefin (and optional additives), and is defined as having a Mw/Mn from 1.7 to 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)^2,$$

where the density, d, is from 0.850 g/cc, or 0.860 g/cc, or 0.870 g/cc to 0.875 g/cc, or 0.877 g/cc, or 0.880 g/cc, or 0.890 g/cc; and the melting point, Tm, is from 110° C., or 115° C., or 120° C. to 125° C., or 130° C., or 135° C.

In an embodiment, the ethylene/α-olefin multi-block copolymer is an ethylene/1-octene multi-block copolymer (consisting only of ethylene and octene comonomer) and has one, some, or all of the following properties:

(i) a Mw/Mn from 1.7, or 1.8 to 2.2, or 2.5, or 3.5; and/or (ii) a density from 0.860 g/cc, or 0.865 g/cc, or 0.870 g/cc, or 0.877 g/cc, or 0.880 g/cc; and/or (iii) a melting point, Tm, from 115° C., or 118° C., or 119° C., or 120° C. to 120° C., or 123° C., or 125° C.; and/or (iv) a melt index (MI) from 0.1 g/10 min, or 0.5 g/10 min to 1.0 g/10 min, or 2.0 g/10 min, or 5 g/10 min, or 10 g/10 min; and/or (v) 50-85 wt % soft segment and 40-15 wt % hard segment; and/or (vi) from 10 mol %, or 13 mol %, or 14 mol %, or 15 mol % to 16 mol %, or 17 mol %, or 18 mol %, or 19 mol %, or 20 mol % $C_4$-$C_{12}$ α-olefin in the soft segment; and/or (vii) from 0.5 mol %, or 1.0 mol %, or 2.0 mol %, or 3.0 mol % to 4.0 mol %, or 5 mol %, or 6 mol %, or 7 mol %, or 9 mol % octene in the hard segment; and/or (viii) an elastic recovery (Re) from 50%, or 60% to 70%, or 80%, or 90%, at 300% 300% $min^{-1}$ deformation rate at 21° C. as measured in accordance with ASTM D 1708; and/or (ix) a polydisperse distribution of blocks and a polydisperse distribution of block sizes.

In an embodiment, the ethylene/α-olefin multi-block copolymer is an ethylene/octene multi-block copolymer. The ethylene/octene multi-block copolymer is sold under the tradename INFUSE™, available from The Dow Chemical Company, Midland, Mich., USA.

In an embodiment, the base polymer for the peroxide-modified ethylene/α-olefin multi-block copolymer is INFUSE™ 9000, available from The Dow Chemical Company.

The ethylene/α-olefin multi-block copolymers can be produced via a chain shuttling process such as described in U.S. Pat. No. 7,858,706, which is herein incorporated by reference. In particular, suitable chain shuttling agents and related information are listed in col. 16 line 39 through col. 19 line 44. Suitable catalysts are described in col. 19 line 45 through col. 46 line 19 and suitable co-catalysts in col. 46 line 20 through col. 51 line 28. The process is described throughout the document, but particularly in col. 51 line 29 through col. 54 line 56. The process is also described, for example, in the following: U.S. Pat. Nos. 7,608,668; 7,893,166; and 7,947,793.

The base ethylene/α-olefin multi-block copolymer may comprise more than one ethylene/α-olefin multi-block copolymer.

In an embodiment, the process includes the step of forming a peroxide-modified ethylene/α-olefin multi-block copolymer. In an embodiment, the peroxide-modified ethylene/α-olefin multi-block copolymer is formed by (i) soaking the base ethylene/α-olefin multi-block copolymer with from 0.05 wt % to 0.10 wt %, or 0.12 wt % peroxide (such as BIBP), based on the combined weight of the base ethylene/α-olefin multi-block copolymer and peroxide; (ii) melt blending the soaked base ethylene/α-olefin multi-block copolymer and peroxide at a temperature from 110° C., or 115° C., or 120° C. to 125° C., or 130° C., or 135° C., or 140° C., or 150° C.; and (iii) compression molding the melt blend to form the peroxide-modified ethylene/α-olefin multi-block copolymer. In an embodiment, the soaking occurs at a temperature of from 23° C., or 30° C., or 40° C., or 50° C., or 55° C., or 60° C. to 65° C., or 70° C., or 75° C., or 80° C.

The peroxide-modified ethylene/α-olefin multi-block copolymer has a gel content of 0%. In other words, the peroxide-modified ethylene/α-olefin multi-block copolymer is crosslink-free, or otherwise void of crosslinking.

The ethylene/α-olefin multi-block copolymer may comprise two or more embodiments disclosed herein.

The peroxide-modified ethylene/α-olefin multi-block copolymer may comprise two or more embodiments disclosed herein.

2. Peroxide-Modified LDPE

In an embodiment, the composition contains a peroxide-modified LDPE. A "peroxide-modified LDPE" is an LDPE that has been melt blended with a peroxide such that the peroxide acts as a rheology modifying agent in such a way (i) that the degree of LCB in the peroxide-modified LDPE is greater than the degree of LCB in the base LDPE prior to peroxide modification, but (ii) the addition of peroxide does not induce crosslinking, as evidenced by the peroxide-modified LDPE having a gel content of 0%.

The base LDPE is a low density polyethylene. "Low density polyethylene" (or "LDPE") consists of ethylene homopolymer, or ethylene/α-olefin copolymer comprising at least one $C_3$-$C_{10}$ α-olefin that has a density from 0.915 g/cc to less than 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

The LDPE has a density from 0.915 g/cc, or 0.916 g/cc, or 0.917 g/cc, or 0.918 g/cc to 0.919 g/cc, or 0.920 g/cc, or 0.925 g/cc, or 0.930 g/cc, or 0.935 g/cc, or 0.940 g/cc.

In an embodiment, the LDPE has a melting point from 90° C., or 95° C., or 100° C., or 105° C., or 108° C. to 109° C., or 110° C., or 115° C., or 120° C., or 125° C.

In an embodiment, the LDPE has a melt index (MI) from 0.1 g/10 min, or 0.5 g/10 min, or 1.0 g/10 min, or 2.0 g/10 min to 2.3 g/10 min, or 2.5 g/10 min, or 3.0 g/10 min, or 4.0 g/10 min, or 5 g/10 min, or 10 g/10 min.

In an embodiment, the LDPE consists of only (i) ethylene and (ii) optionally, a $C_4$-$C_8$ α-olefin (and optional additives). In a further embodiment, the LDPE consists of only ethylene. In an embodiment, the LDPE has one, some, or all of the following properties:

(i) a density from 0.915 g/cc, or 0.916 g/cc, or 0.917 g/cc, or 0.918 g/cc to 0.919 g/cc, or 0.920 g/cc; and/or (ii) a melting point from 100° C., or 105° C., or 108° C. to 109° C., or 110° C., or 115° C.; and/or (iii) a melt index (MI) from 0.5 g/10 min, or 1.0 g/10 min, or 2.0 g/10 min to 2.3 g/10 min, or 2.5 g/10 min, or 3.0 g/10 min, or 4.0 g/10 min.

The base LDPE may comprise more than one LDPE.

In an embodiment, the process includes the step of forming a peroxide-modified LDPE. The peroxide-modified LDPE is formed by (i) soaking the base LDPE with from 0.01 wt %, or 0.02 wt % to 0.04 wt % peroxide (such as BIBP), based on the combined weight of the base LDPE and peroxide; (ii) melt blending the soaked base LDPE and peroxide at a temperature from 90° C., or 95° C., or 100° C., or 110° C., or 115° C., or 120° C. to 125° C., or 130° C., or 135° C., or 140° C., or 150° C.; and (iii) compression molding the melt blend to form the peroxide-modified LDPE. In an embodiment, the soaking occurs at a temperature of from 23° C., or 30° C., or 40° C., or 50° C., or 55° C., or 60° C. to 65° C., or 70° C., or 75° C., or 80° C.

The peroxide-modified LDPE has a gel content of 0%. In other words, the peroxide-modified LDPE is crosslink-free, or otherwise void of crosslinking The LDPE may comprise two or more embodiments disclosed herein.

The peroxide-modified LDPE may comprise two or more embodiments disclosed herein.

In an embodiment, the composition includes from 5 wt %, or 10 wt %, or 15 wt %, or 20 wt % to 25 wt %, or 30 wt %, or 35 wt %, or 40 wt %, or 45 wt %, or 50 wt %, or 55 wt %, or 60 wt %, or 70 wt %, or 80 wt %, or 90 wt %, or 95 wt %, or 100 wt % peroxide-modified ethylene-based polymer, based on the total weight of the composition.

In an embodiment, the composition consists essentially of, or consists of, the peroxide-modified ethylene-based polymer.

The peroxide-modified ethylene-based polymer may comprise two or more embodiments disclosed herein.

B. Optional Ethylene/α-Olefin Multi-Block Copolymer

In an embodiment, the composition contains either (i) the peroxide-modified ethylene/α-olefin multi-block copolymer or (ii) the peroxide-modified LDPE, and (iii) an optional ethylene/α-olefin multi-block copolymer. The optional ethylene/α-olefin multi-block copolymer is structurally distinct from the peroxide-modified ethylene/α-olefin multi-block copolymer because the optional ethylene/α-olefin multi-block copolymer has not been rheology modified with peroxide.

The optional ethylene/α-olefin multi-block copolymer may be any base ethylene/α-olefin multi-block copolymer disclosed herein.

The base ethylene/α-olefin multi-block copolymer of the peroxide-modified ethylene/α-olefin multi-block copolymer may be the same or different than the optional ethylene/α-olefin multi-block copolymer. In an embodiment, the base ethylene/α-olefin multi-block copolymer of the peroxide-modified ethylene/α-olefin multi-block copolymer is the same as the optional ethylene/α-olefin multi-block copolymer. In another embodiment, the base ethylene/α-olefin multi-block copolymer of the peroxide-modified ethylene/α-olefin multi-block copolymer is structurally, compositionally, and/or physical different than the optional ethylene/α-olefin multi-block copolymer.

In an embodiment, the optional ethylene/α-olefin multi-block copolymer is an ethylene/1-octene multi-block copolymer.

In an embodiment, the composition contains from 0 wt %, or 5 wt %, or 10 wt %, or 20 wt %, or 30 wt %, or 40 wt %, or 45 wt %, or 50 wt %, or 55 wt %, or 60 wt %, or 65 wt %, or 70 wt %, or 75 wt % to 80 wt %, or 85 wt %, or 90 wt %, or 95 wt % optional ethylene/α-olefin multi-block copolymer, based on the total weight of the composition. In another embodiment, the composition contains from 50 wt %, or 55 wt %, or 60 wt % to 90 wt %, or 95 wt % optional ethylene/α-olefin multi-block copolymer, based on the total weight of the composition.

The optional ethylene/α-olefin multi-block copolymer may comprise two or more embodiments disclosed herein.

C. Optional Additive

In an embodiment, the composition contains one or more additives. Nonlimiting examples of suitable additives include but are not limited to, nucleators (e.g., talc and polytetrafluoroethylene (PTFE)), processing aids, lubricants, stabilizers (antioxidants), foaming aids, surfactants, flow aids, viscosity control agents, coloring agents, copper inhibitors, inorganic fillers (e.g., calcium carbonate ($CaCO_3$), titanium dioxide ($TiO_2$)), and combinations thereof. These additives can be added to the peroxide-modified ethylene-based polymer and/or the optional ethylene/α-olefin multi-block copolymer either before or during processing.

In an embodiment, the total amount of additives in the composition is from 0 wt %, or 0.01 to 0.3 wt %, or 0.5 wt %, or 1 wt %, or 2 wt %, or 3 wt %, or 5 wt %, based on the total weight of the composition.

In an embodiment, the composition excludes an additive (e.g., an inorganic filler).

The additive may comprise two or more embodiments discussed herein.

In an embodiment, the composition has a gel content of 0%.

In an embodiment, the composition has a melt strength from 9.0 cN, or 9.5 cN, or 9.7 cN, or 14.0 cN to 21.0 cN, or 29.6 cN, or 30.0 cN, or 35.0 cN, or 40.0 cN, or 50.0 cN. In another embodiment, the composition has a melt strength from 9.0 cN to 10 cN. In another embodiment, the composition has a melt strength from 14.0 cN to 21.0 cN, or 30 cN. Other features being equal, a higher melt strength indicates a composition has improved foaming ability.

In an embodiment, the composition contains from 5 wt %, or 10 wt %, or 15 wt %, or 20 wt % to 25 wt %, or 30 wt %, or 35 wt %, or 40 wt %, or 45 wt %, or 50 wt %, or 55 wt %, or 60 wt %, or 70 wt %, or 80 wt %, or 90 wt %, or 95 wt %, or 100 wt % peroxide-modified ethylene-based polymer and a reciprocal amount of optional ethylene/α-olefin multi-block copolymer, or from 0 wt %, or 5 wt %, or 10 wt %, or 20 wt %, or 30 wt %, or 40 wt %, or 45 wt %, or 50 wt %, or 55 wt %, or 60 wt %, or 65 wt %, or 70 wt %, or 75 wt % to 80 wt %, or 85 wt %, or 90 wt %, or 95 wt % ethylene/α-olefin multi-block copolymer, based on the total weight of the composition.

In an embodiment, the composition contains, consists essentially of, or consists of:

(A) from 10 wt % to 40 wt %, or 50 wt %, or 60 wt %, or 70 wt %, or 80 wt %, or 90 wt %, or 100 wt % of the peroxide-modified ethylene-based polymer selected from a peroxide-modified ethylene/α-olefin multi-block copolymer, a peroxide-modified low density polyethylene, and combinations thereof;

(B) from 0 wt %, or 10 wt %, or 20 wt %, or 30 wt %, or 40 wt %, or 50 wt %, or 60 wt % to 90 wt % of the optional ethylene/α-olefin multi-block copolymer; and (C) from 0 wt %, or 0.01 to 0.3 wt %, or 0.5 wt %, or 1 wt %, or 2 wt %, or 3 wt %, or 5 wt % additive, based on the total weight of the composition.

It is understood that the sum of the components in each of the compositions disclosed herein, including the foregoing compositions, yields 100 weight percent (wt %).

In an embodiment, the composition contains, consists essentially of, or consists of, the peroxide-modified ethylene/α-olefin multi-block copolymer and the ethylene/α-olefin multi-block copolymer. In a further embodiment, the composition contains, consists essentially of, or consists of, from 10 wt % to 40 wt % of the peroxide-modified ethylene/α-olefin multi-block copolymer and from 60 wt % to 90 wt % of the ethylene/α-olefin multi-block copolymer, based on the total weight of the composition.

In an embodiment, the composition contains, consists essentially of, or consists of, the peroxide-modified LDPE and the ethylene/α-olefin multi-block copolymer. In a further embodiment, the composition contains, consists essentially of, or consists of, from 10 wt % to 20 wt % of the peroxide-modified LDPE and from 80 wt % to 90 wt % of the ethylene/α-olefin multi-block copolymer, based on the total weight of the composition.

In an embodiment, the composition excludes ethylene vinyl acetate (EVA) copolymer.

In an embodiment, the composition excludes ethylene plastomers/elastomers.

The composition may comprise two or more embodiments discussed herein.

In an embodiment, the process includes the step of pelletizing the composition. The pellet may have a diameter from 2.0 mm, or 2.3 mm to 3.0 mm, or 3.5 mm and a length from 2.0 mm, or 2.3 mm to 3.0 mm, or 3.5 mm. In an embodiment, the composition is in the form of a pellet with a diameter from 2.3 mm to 3.0 mm and a length from 2.3 mm to 3.0 mm.

The step of forming a composition may comprise two or more embodiments discussed herein.

ii. Contacting the Composition with a Blowing Agent to Form a Foam Composition; and iii. Forming Foam Beads Containing the Foam Composition The process includes the steps of contacting the composition with a blowing agent to form a foam composition; and forming foam beads composed of the foam composition. The composition may be any composition disclosed herein.

A "blowing agent" is a substance that is capable of producing a cellular structure in the composition via a foaming process. A nonlimiting example of a suitable blowing agent is a physical blowing agent. Nonlimiting examples of suitable physical blowing agents include an inert gas such as nitrogen ($N_2$), a carbon gas (e.g., CO, $CO_2$, etc.), helium, and argon; hydrocarbon such as methane, propane, and butane (e.g., isobutane), pentane; and halogenated hydrocarbons such as dichlorodifluoromethane, dichloromonofluoromethane, monochlorodifluoromethane, trichloromonofluoromethane, monochloropentafluoroethane, and trichlorotrifluoroethane.

In an embodiment, the physical blowing agent is carbon dioxide ($CO_2$). A nonlimiting example of a suitable carbon dioxide is supercritical carbon dioxide. Supercritical carbon dioxide is a fluid state of carbon dioxide that is held at or above its critical temperature (31.10° C.) and critical pressure (7.39 MPa).

In an embodiment, the blowing agent is a physical blowing agent to the exclusion of chemical blowing agents.

Nonlimiting examples of methods of contacting the composition with a blowing agent to form a foam composition, and forming foam beads including the foam composition include (a) contacting the composition with a blowing agent, and undergoing a sudden pressure drop (depressurization) or a temperature increase of the contacted composition in an autoclave to form the foam beads, and (b) via foam extrusion with under-water pelletizing.

A "foam composition" is the present composition with a cellular structure. In other words, the present composition in its native state and prior to contact with the blowing agent is void of a cellular structure, and after contact with the blowing agent and depressurization, the present composition is a foam composition with a cellular structure. The cells may be open cells, closed cells, or combinations thereof. In an embodiment, the cells have a uniform, or substantially uniform, cell size.

A "foam bead" is a foamed structure containing the foam composition, the structure having a diameter from 4 mm, or 5 mm to 6 mm, or 7 mm; and/or a length from 4 mm, or 5 mm to 6 mm, or 7 mm.

In an embodiment, the blowing agent is present in an amount of from 0.001 parts by weight, or 0.005 parts by weight, to 0.05 parts by weight, or 0.10 parts by weight of the composition to be foamed. In another embodiment, the blowing agent is present in an amount of from 0.1 wt %, or 0.5 wt %, or 1.0 wt % to 2.0 wt %, or 5.0 wt %, or 8.0 wt %, or 10.0 wt %, based on the combined weight of the composition and blowing agent.

In an embodiment, the process includes contacting the composition with the physical blowing agent at a temperature of from 100° C., or 110° C., or 115° C., or 120° C. to 125° C., or 130° C., or 135° C.

In an embodiment, the composition is contacted with the physical blowing agent (e.g., supercritical carbon dioxide) by soaking the composition in the physical blowing agent.

In an embodiment, the composition is contacted with the physical blowing agent (e.g., supercritical carbon dioxide) via impregnation of composition pellets with the blowing agent in an autoclave. The impregnating occurs at a temperature within ±0° C. to ±10° C. of the melting point of the peroxide-modified ethylene-based polymer and/or the optional ethylene/α-olefin multi-block copolymer. In a further embodiment, the impregnating occurs at a temperature from 110° C., or 115° C., or 120° C. to 125° C., or 130° C., or 135° C. In an embodiment, the impregnating occurs with a physical blowing agent pressure of from 5 MPa, or 8 MPa, or 10 MPa, or 11 MPa to 12 MPa, or 13 MPa, or 15 MPa, or 20 MPa, or 25 MPa, or 30 MPa and a saturation time of from 0.5 hours, or 1.0 hour to 1.5 hours, or 2.0 hours, or 3.0 hours. Following the saturation time, the autoclave is depressed to 25° C. and 0.1 MPa. During depression, the impregnated composition pellets expand to form foam beads containing the foam composition.

In another embodiment, the composition is contacted with the physical blowing agent (e.g., supercritical carbon dioxide) via foam extrusion with under-water pelletizing. The physical blowing agent may be mixed with an organic polymer to be foamed in advance or may be supplied into an extruder from a blowing agent supply opening formed on the barrel of the extruder. In an embodiment, the contacting occurs in a foaming extruder. In a further embodiment, the process includes feeding the composition (such as the composition pellets) into a foaming extruder and supplying the physical blowing agent into the extruder from a blowing agent supply opening formed on the barrel of the extruder at a pressure of from 5 MPa, or 8 MPa, or 10 MPa, or 11 MPa to 12 MPa, or 13 MPa, or 15 MPa, or 20 MPa, or 25 MPa, or 30 MPa, the extrusion occurring at a temperature from 110° C., or 115° C. to 130° C., or 135° C. The composition is foamed as it exits the extruder, for the pressure drop results in foaming by the dissolved gas. The foam composition is then pelletized under water to form foam beads.

The foam bead is not crosslinked. In other words, the foam bead has a gel content of 0%. A foam bead that is not crosslinked is advantageous because it provides a thermoplastic foam bead. In other words, the foam bead may be melt processed further to form a foamed article. Foam beads that are crosslinked (i.e., have a gel content of greater than 0%, typically from 60% to 80%) cannot be melt processed to form an article because the crosslinked foam beads cannot melt together and fuse to form a single article. Furthermore, foam beads that are crosslinked (i.e., have a gel content of greater than 0%, typically from 60% to 80%) cannot be sintered because the foam beads cannot fuse to form a uniform article.

In an embodiment, the foam bead has a foam density of less than 0.300 g/cc. In another embodiment, the foam bead has a foam density from 0.150 g/cc, or 0.190 g/cc, or 0.195 g/cc to 0.210 g/cc, or 0.223 g/cc, or 0.230 g/cc, or 0.236 g/cc, or 0.240 g/cc, or 0.286 g/cc, or 0.290 g/cc, or 0.295 g/cc, or 0.299 g/cc. Other features being equal, a lower foam density indicates a composition has improved foaming ability.

In an embodiment, the foam bead is formed from a composition having a gel content of 0%.

In an embodiment, the foam bead is formed from a composition having a melt index from greater than 0 g/10 min, or 0.001 g/10 min, or 0.01 g/10 min, or 0.30 g/10 min to 0.44 g/10 min, or 0.45 g/10 min, or 0.50 g/10 min.

In an embodiment, the foam bead is formed from a composition having a low shear viscosity (at 1 rad/sec) from 30,000 Pa·s, or 31,000 Pa·s, or 31,500 Pa·s, or 31,900 Pa·s, or 38,000 Pa·s to 47,500 Pa·s, or 48,000 Pa·s, or 50,000 Pa·s.

In an embodiment, the foam bead is formed from a composition having a high shear viscosity (at 100 rad/sec) from 2,000 Pa·s, or 2,500 Pa·s, or 2,600 Pa·s, or 2,900 Pa·s, or 3,000 Pa·s to 3,500 Pa·s, or 4,000 Pa·s.

In an embodiment, the foam bead has at least one melting point from 110° C., or 115° C., or 120° C. to 125° C., or 130° C., or 135° C.

In an embodiment, the composition contains, consists essentially of, or consists solely of, the peroxide-modified ethylene/α-olefin multi-block copolymer, and, optionally, an additive, and the composition has one, some, or all of the following properties:
   (a) a gel content of 0%; and/or
   (b) a melt strength from 14.0 cN, or 15.0 cN, or 20.0 cN, or 25.0 cN, or 28.0 cN to 29.6 cN, or 30.0 cN; and/or
   (c) a melt index from greater than 0 g/10 min to 0.01 g/10 min; and the foam bead containing the foam composition has one or both of the following properties:
   (i) a gel content of 0%; and/or
   (ii) a foam density from 0.190 g/cc, or 0.195 g/cc to 0.210 g/cc, or 0.215 g/cc, or 0.220 g/cc.

In an embodiment, the composition contains, consists essentially of, or consists of, from 5 wt %, or 10 wt % to 40 wt %, or 50 wt % of the peroxide-modified ethylene/α-olefin multi-block copolymer and from 50 wt %, or 60 wt % to 90 wt %, or 95 wt % of the ethylene/α-olefin multi-block copolymer, and optionally, an additive, based on the total weight of the composition, and the composition has one, some, or all of the following properties:
   (a) a gel content of 0%; and/or
   (b) a melt strength from 9.0 cN to 9.7 cN, or 10 cN; and/or
   (c) a melt index from 0.01 g/10 min, or 0.30 g/10 min to 0.35 g/10 min, or 0.40 g/10 min, or 0.45 g/10 min, or 0.50 g/10 min; and/or
   (d) a low shear viscosity (at 1 rad/sec) from 36,000 Pa·s, or 37,000 Pa·s, or 38,000 Pa·s to 47,500 Pa·s, or 48,000 Pa·s, or 50,000 Pa·s; and/or
   (e) a high shear viscosity (at 100 rad/sec) from 3,000 Pa·s, or 3,100 Pa·s, or 3,200 Pa·s to 3,400 Pa·s, or 3,500 Pa·s, or 4,000 Pa·s; and
the foam bead containing the foam composition has one or both of the following properties:
   (i) a gel content of 0%; and/or
   (ii) a foam density from 0.200 g/cc, or 0.210 g/cc, or 0.220 g/cc, or 0.230 g/cc, or 0.235 g/cc to 0.290 g/cc, or 0.295 g/cc, or 0.299 g/cc.

In an embodiment, the composition contains, consists essentially of, or consists of, from 5 wt %, or 10 wt % to 20 wt %, or 30 wt %, or 40 wt % of the peroxide-modified LDPE and from 60 wt %, or 70 wt %, or 80 wt % to 90 wt %, or 95 wt % of the ethylene/α-olefin multi-block copolymer, and optionally, an additive, based on the total weight of the composition, and the composition has one, some, or all of the following properties:
   (a) a gel content of 0%; and/or
   (b) a melt strength from 14.0 cN to 21.0 cN, or 25.0 cN; and/or
   (c) a melt index from 0.30 g/10 min, or 0.35 g/10 min, or 0.40 g/10 min to 0.44 g/10 min, or 0.45 g/10 min, or 0.50 g/10 min; and/or
   (d) a low shear viscosity (at 1 rad/sec) from 30,000 Pa·s, or 31,000 Pa·s, or 31,500 Pa·s to 36,500 Pa·s, or 37,000 Pa·s, or 39,000 Pa·s; and/or
   (e) a high shear viscosity (at 100 rad/sec) from 2,000 Pa·s, or 2,500 Pa·s, or 2,600 Pa·s to 3,000 Pa·s, or 3,200 Pa·s, or 3,500 Pa·s; and
the foam bead containing the foam composition has one or both of the following properties:
   (i) a gel content of 0%; and/or
   (ii) a foam density from 0.180 g/cc, or 0.185 g/cc, or 0.190 g/cc, or 0.195 g/cc to 0.225 g/cc, or 0.230 g/cc, or 0.235 g/cc.

The present disclosure also provides a foam bead formed from the present process. The foam bead may be any foam bead disclosed herein. In an embodiment, the composition has a melt strength from 9 cN to 30 cN and a gel content of 0%; and the foam bead has a foam density of less than 0.300 g/cc.

The step of contacting the composition with a blowing agent to form a foam composition may comprise two or more embodiments discussed herein.

The step of forming foam beads containing the foam composition may comprise two or more embodiments discussed herein.

iv. Forming an Article from the Foam Beads

In an embodiment, the process includes the step of forming an article from the foam beads.

The article is formed via sintering of the foam beads. A nonlimiting method of sintering includes steam-chest molding. Steam-chest molding occurs at a temperature from 80° C., or 90° C. to 100° C., or 110° C. and/or a pressure from 0.1 MPa, or 0.2 MPa to 1.0 MPa, or 1.2 MPa. Bounded by no particular theory, it is believed that the high melting temperature (110° C. to 135° C.) of the peroxide-modified ethylene/α-olefin multi-block copolymer and/or the high melting temperature (110° C. to 135° C.) of the ethylene/α-olefin multi-block copolymer enables the foam beads to withstand the high temperature of steam-chest molding without shrinkage (i.e., without an increase in foam density). In contrast, foam beads formed from polymers with lower melting points, such as ethylene vinyl acetate copolymer (e.g., TAISOX™ 7360M with a melting point of 80° C., available from Formosa Plastics Corporation) and polyolefin elastomers (e.g., ENGAGE™ 8003 with a melting point of 77° C., available from The Dow Chemical Company), are known to exhibit shrinkage (i.e., an increase in foam density) due to steam-chest molding.

In an embodiment, after exposure to 100° C. for 5 minutes, the foam bead exhibits a change in density of from ±2%, or ±1%, or ±0.5% to 0%. The change in density is calculated in accordance with the following Equation 1:

$$\text{Change in Foam Density} = \frac{\text{initial foam density} - \text{foam density after exposure to } 100°\text{C. for 5 min}}{\text{initial foam density}} \times 100 \qquad \text{Equation 1}$$

wherein "initial foam density" is the density of the foam prior to exposure to 100° C. for 5 minutes.

Nonlimiting examples of suitable articles made from the present foam composition, and further the present foam beads, include footwear (e.g., midsoles of footwear), packaging, sporting goods, construction materials, and insulation.

The step of forming an article from the foam beads may comprise two or more embodiments discussed herein.

The present process may comprise two or more embodiments discussed herein.

Foam Bead

The present disclosure also provides a foam bead. The foam bead contains the composition including a peroxide-modified ethylene-based polymer selected from a peroxide-modified ethylene/α-olefin multi-block copolymer, a peroxide-modified low density polyethylene, and combinations thereof. The composition has (a) a melt strength from 9 cN to 30 cN and (b) a gel content of 0%. The foam bead has a foam density of less than 0.300 g/cc.

The foam bead may be any foam bead disclosed herein. The foam bead may be formed from any foam composition disclosed herein.

In an embodiment, the foam bead contains, consists essentially of, or consists solely of, the composition containing, consisting essentially of, or consisting solely of, peroxide-modified ethylene/α-olefin multi-block copolymer, and, optionally, an additive; and the composition has (a) a melt strength from 14.0 cN, or 15.0 cN, or 20.0 cN, or 25.0 cN, or 28.0 cN to 29.6 cN, or 30.0 cN; and (b) a gel content of 0%; and (c) optionally, a melt index from greater than 0 g/10 min to 0.01 g/10 min; and the foam bead has (i) a foam density from 0.190 g/cc, or 0.195 g/cc to 0.210 g/cc, or 0.215 g/cc, or 0.220 g/cc; and (ii) optionally, a gel content of 0%.

In an embodiment, the foam bead contains, consists essentially of, or consists solely of, the composition containing, consisting essentially of, or consisting solely of, from 5 wt %, or 10 wt % to 40 wt %, or 50 wt % of the peroxide-modified ethylene/α-olefin multi-block copolymer and from 50 wt %, or 60 wt % to 90 wt %, or 95 wt % of the ethylene/α-olefin multi-block copolymer, and optionally, an additive, based on the total weight of the composition, and the composition has (a) a melt strength from 9.0 cN to 9.7 cN, or 10 cN;

(b) a gel content of 0%;

(c) optionally, a melt index from 0.01 g/10 min, or 0.30 g/10 min to 0.35 g/10 min, or 0.40 g/10 min, or 0.45 g/10 min, or 0.50 g/10 min;

(d) optionally, a low shear viscosity (at 1 rad/sec) from 36,000 Pa·s, or 37,000 Pa·s, or 38,000 Pa·s to 47,500 Pa·s, or 48,000 Pa·s, or 50,000 Pa·s; and (e) optionally, a high shear viscosity (at 100 rad/sec) from 3,000 Pa·s, or 3,100 Pa·s, or 3,200 Pa·s to 3,400 Pa·s, or 3,500 Pa·s, or 4,000 Pa·s; and the foam bead has (i) a foam density from 0.200 g/cc, or 0.210 g/cc, or 0.220 g/cc, or 0.230 g/cc, or 0.235 g/cc to 0.290 g/cc, or 0.295 g/cc, or 0.299 g/cc; and (ii) optionally, a gel content of 0%.

In an embodiment, the foam bead contains, consists essentially of, or consists solely of, the composition containing, consisting essentially of, or consisting solely of, from 5 wt %, or 10 wt % to 20 wt %, or 30 wt %, or 40 wt % of the peroxide-modified LDPE and from 60 wt %, or 70 wt %, or 80 wt % to 90 wt %, or 95 wt % of the ethylene/α-olefin multi-block copolymer, and optionally, an additive, based on the total weight of the composition, and the composition has (a) a melt strength from 14.0 cN to 21.0 cN, or 25.0 cN;

(b) a gel content of 0%;

(c) optionally, a melt index from 0.30 g/10 min, or 0.35 g/10 min, or 0.40 g/10 min to 0.44 g/10 min, or 0.45 g/10 min, or 0.50 g/10 min;

(d) optionally, a low shear viscosity (at 1 rad/sec) from 30,000 Pa·s, or 31,000 Pa·s, or 31,500 Pa·s to 36,500 Pa·s, or 37,000 Pa·s, or 39,000 Pa·s;

(e) optionally, a high shear viscosity (at 100 rad/sec) from 2,000 Pa·s, or 2,500 Pa·s, or 2,600 Pa·s to 3,000 Pa·s, or 3,200 Pa·s, or 3,500 Pa·s; and the foam bead has (i) a foam density from 0.180 g/cc, or 0.185 g/cc, or 0.190 g/cc, or 0.195 g/cc to 0.225 g/cc, or 0.230 g/cc, or 0.235 g/cc; and (ii) optionally, a gel content of 0%.

In an embodiment, the foam bead has at least one melting point from 110° C., or 115° C., or 120° C. to 125° C., or 130° C., or 135° C.

In an embodiment, the foam bead excludes ethylene vinyl acetate (EVA) copolymer.

In an embodiment, the foam bead excludes ethylene plastomers/elastomers.

The foam bead may comprise two or more embodiments discussed herein.

By way of example, and not limitation, some embodiments of the present disclosure will now be described in detail in the following Examples.

EXAMPLES

Materials used in the examples are provided in Table 1 below.

TABLE 1

| Material/Description | Properties | Source |
| --- | --- | --- |
| INFUSE ™ 9530 | ethylene/1-octene multi-block copolymer density = 0.887 g/cc; melting point = 119° C.; melt index (190° C./2.16 kg) = 5.0 g/10 min; pellets | The Dow Chemical Company |
| INFUSE ™ 9000 | ethylene/1-octene multi-block copolymer density = 0.877 g/cc; melting point = 120° C.; melt index (190° C./2.16 kg) = 0.5 g/10 min | The Dow Chemical Company |
| TAISOX ™ 7360M | ethylene vinyl acetate (EVA) copolymer vinyl acetate content = 21.0 wt %; density = 0.941 g/cc; melting point = 80° C.; melt index (190° C./2.16 kg) = 2.0 g/10 min; pellets | Formosa Plastics Corporation |

TABLE 1-continued

| Material/Description | Properties | Source |
|---|---|---|
| ENGAGE ™ HM 7487 | ethylene/1-butene copolymer; polyolefin elastomer density = 0.860 g/cc; melting point = 37° C.; melt index (190° C./2.16 kg) = < 0.50 g/10 min; pellets | The Dow Chemical Company |
| DOW ™ LDPE 621I | ethylene homopolymer (LDPE) density = 0.918 g/cc; melting point = 108° C.; melt index (190° C./2.16 kg) = 2.3 g/10 min; pellets | The Dow Chemical Company |
| bis(t-butylperoxy) diisopropylbenzene (BIBP) | melting point = 41° C.; flakes | AkzoNobel Polymer Chemistry |

Preparation of Peroxide-Modified Ethylene-Based Polymer

Peroxide-modified ethylene/α-olefin multi-block copolymer (peroxide-modified INFUSE™ 9000) and peroxide-modified LDPE (peroxide-modified LDPE 621I) are prepared by soaking the base ethylene/α-olefin multi-block copolymer and the base LDPE, respectively, in 1 wt % BIBP at 65° C., adding base component to the desired concentration, and then melt blending the soaked base component and peroxide with a Haake mixer at 120° C. The melt blend is then compression molded at 185° C. to form a peroxide-modified ethylene-based polymer. The concentration of each component is provided in Table 2.

The gel content of the peroxide-modified ethylene-based polymers is measured. The results are provided in Table 2.

TABLE 2

|  | Peroxide-Modified INFUSE ™ 9000 | Peroxide-Modified LDPE 621I |
|---|---|---|
| INFUSE ™ 9000 | 99.90 wt % | — |
| DOW ™ LDPE 621I | — | 99.96 wt % |
| bis(t-butylperoxy) diisopropylbenzene (BIBP) | 0.10 wt % | 0.04 wt % |
| Gel Content | 0% | 0% |

Preparation of Foam Beads

Compositions are formed from the materials of Table 1 and Table 2. The contents of each composition is provided below in Table 3. Compositions are measured for gel content, melt strength, melt index, low shear viscosity (1 rad/s), and high shear viscosity (100 rad/s). The results are provided in Table 3.

The compositions are then impregnated with 11 MPa supercritical carbon dioxide ($CO_2$) at 120° C. in a closed stainless steel autoclave. The saturation time is 1.5 hours. Then, foam beads are obtained via quick depressing (to 0.1 MPa, 25° C., within 1 second) using a pressure relief valve. Foam beads are measured for foam density. The results are provided in Table 3. In Table 3, "CS" refers to Comparative Sample.

TABLE 3*

|  | Ex. 1 | Ex. 2 | Ex. 3 | Ex. 4 | Ex. 5 |
|---|---|---|---|---|---|
| Peroxide-Modified INFUSE ™ 9000 | 100 | 10 | 40 | — | — |
| Peroxide-Modified LDPE 621I | — | — | — | 10 | 20 |
| INFUSE ™ 9000 | — | 90 | 60 | 90 | 80 |
| INFUSE ™ 9530 | — | — | — | — | — |
| DOW ™ LDPE 621I | — | — | — | — | — |
| TAISOX ™ 7360M | — | — | — | — | — |
| ENGAGE ™ HM 7487 | — | — | — | — | — |
| Total (wt %) | 100 | 100 | 100 | 100 | 100 |
| Composition Properties | | | | | |
| Gel Content (%) | 0 | 0 | 0 | 0 | 0 |
| Melt Strength (cN) | 29.6 | 9.0 | 9.7 | 14.1 | 21.0 |
| Melt Index (g/10 min) | <0.01 | 0.35 | 0.32 | 0.44 | 0.40 |
| Low Shear Viscosity (Pa · s, 1 rad/s) | 45,552 | 38,436 | 47,193 | 36,054 | 31,964 |
| High Shear Viscosity (Pa · s, 100 rad/s) | 2,503 | 3,240 | 3,322 | 2,964 | 2,693 |

TABLE 3*-continued

| Foam Bead Properties | | | | | |
|---|---|---|---|---|---|
| Foam Density (g/cc) | 0.210 | 0.286 | 0.236 | 0.223 | 0.195 |

| | CS 1 | CS 2 | CS 3 | CS 4 | CS 5 |
|---|---|---|---|---|---|
| Peroxide-Modified INFUSE ™ 9000 | — | — | — | — | — |
| Peroxide-Modified LDPE 621I | — | — | — | — | — |
| INFUSE ™ 9000 | 100 | 90 | 70 | 80 | — |
| INFUSE ™ 9530 | — | — | — | — | 100 |
| DOW ™ LDPE 621I | — | — | — | 20 | — |
| TAISOX ™ 7360M | — | 10 | — | — | — |
| ENGAGE ™ HM 7487 | — | — | 30 | — | — |
| Total (wt %) | 100 | 100 | 100 | 100 | 100 |
| Composition Properties | | | | | |
| Gel Content (%) | 0 | 0 | 0 | 0 | 0 |
| Melt Strength (cN) | 5.5 | 5.3 | 7.5 | 13.3 | <1.0 |
| Melt Index (g/10 min) | 0.49 | 0.68 | 0.42 | 0.52 | 5 |
| Low Shear Viscosity (Pa · s, 1 rad/s) | 35,387 | 30,044 | 38,917 | 33,353 | 6341 |
| High Shear Viscosity (Pa · s, 100 rad/s) | 3,173 | 2,824 | 3,533 | 2,657 | 1592 |
| Foam Bead Properties | | | | | |
| Foam Density (g/cc) | 0.314 | 0.381 | 0.454 | 0.305 | 0.430 |

*wt %, based on the weight of the total composition

As shown in Table 3, foam beads formed from a composition containing (i) a peroxide-modified ethylene/α-olefin multi-block copolymer (peroxide-modified INFUSE™ 9000) or (ii) a peroxide-modified LDPE (Peroxide-Modified LDPE 621I) (Ex. 1-Ex. 5) advantageously exhibit (a) a gel content of 0%, as measured on the composition, and (b) a foam density of less than 0.300 g/cc. Consequently, Ex. 1-Ex. 5 advantageously exhibit a low foam density (less than 0.300 g/cc), while also maintaining a thermoplastic nature (gel content of 0%). Furthermore, the composition advantageously exhibits a melt strength from 9 cN to 30 cN.

In contrast, comparative foam beads formed from a composition that lacks a peroxide-modified ethylene-based polymer (CS 1-CS 5) exhibit a foam density greater than 0.300 g/cc and/or the composition has a melt strength of less than 9 cN and/or.

Foam beads formed from a composition containing 100 wt % peroxide-modified INFUSE™ 9000 (Ex. 1) advantageously exhibit a low foam density (0.210 g/cc) and the composition advantageously exhibits a high melt strength (29.6 cN), each indicating that the foam beads are formed from a composition with improved foamability. In contrast, foam beads formed from a composition containing 100 wt % INFUSE™ 9000 that has not been peroxide-modified (CS 1) exhibits a higher density (0.314 g/cc) and the composition exhibits a lower melt strength (5.5 cN). Without being bound by any particular theory, it is believed that the improvement in melt strength between CS 1 and Ex. 1 is due to the increased long chain branching in the peroxide-modified INFUSE™ 9000 (Ex. 1).

While the gel content of the foam bead Ex. 1-5 is not measured, Applicant expects that the foam bead of Ex. 1-5 each has a gel content of 0% because there is no further crosslinking reaction during the depressurization of the composition that forms the cellular structure of the foam beads.

It is specifically intended that the present disclosure not be limited to the embodiments and illustrations contained herein, but include modified forms of those embodiments including portions of the embodiments and combinations of elements of different embodiments as come within the scope of the following claims.

We claim:
1. A process comprising:
(A) forming a composition by melt blending a blend consisting of
(1) from 10 wt % to 40 wt % of
(i) a peroxide-modified ethylene/α-olefin multi-block copolymer with a base ethylene/α-olefin multi-block copolymer consisting of ethylene and $C_4$-$C_8$ α-olefin comonomer having a melting point from 115° C. to 125° C. and a density from 0.865 g/cc to 0.88 g/cc, modified with 0.10 wt % to 0.12 wt % peroxide, and
(ii) an optional additive selected from the group consisting of nucleators, processing aids, lubricants, stabilizers, antioxidants, foaming aids, surfactants, flow aids, viscosity control agents, coloring agents, copper inhibitors, inorganic fillers, and combinations thereof, and
(2) from 90 wt % to 60 wt % of an ethylene/α-olefin multi-block copolymer consisting of ethylene and $C_4$-$C_8$ α-olefin comonomer having a melting point from 115° C. to 125° C. and a density from 0.865 g/cc to 0.88 g/cc;
(B) contacting the composition with a blowing agent to form a foam composition; and

(C) forming foam beads comprising the foam composition, the foam beads having
(a) a melt strength from 9 cN to 10 cN,
(b) a gel content of 0%,
(c) a foam density from 0.230 g/cc to 0.290 g/cc,
(d) a melt index from 0.3 g/10 min to 0.4 g/10 min,
(e) a low shear viscosity (at 1 rad/second) from 38,000 Pa·s to 48,000 Pa·s, and
(f) a high shear viscosity (at 100 rad/second) from 3200 Pa·s to 3400 Pa·s.

2. The process of claim 1 comprising contacting the composition with the blowing agent at a temperature of from 100° C. to 130° C.

3. The process of claim 1 wherein the blowing agent is a physical blowing agent.

4. A process comprising:
(A) forming a composition by melt blending a blend consisting of
(1) from 10 wt % to 20 wt % of (i) a peroxide-modified low density polyethylene homopolymer with a base low density polyethylene homopolymer having a melting point from 105° C. to 110° C. and a density from 0.915 g/cc to 0.920 g/cc, modified with from 0.02 wt % to 0.04 wt % peroxide, and (ii) an optional additive selected from the group consisting of nucleators, processing aids, lubricants, stabilizers, antioxidants, foaming aids, surfactants, flow aids, viscosity control agents, coloring agents, copper inhibitors, inorganic fillers, and combinations thereof, and
(2) from 90 wt % to 80 wt % of an ethylene/α-olefin multi-block copolymer having a melting point from 115° C. to 125° C. and a density from 0.865 g/cc to 0.88 g/cc,
(B) contacting the composition with a blowing agent to form a foam composition; and
(C) forming foam beads comprising the foam composition,
the foam beads having
(a) a melt strength from 14.0 cN to 21.0 cN,
(b) a gel content of 0%,
(c) a foam density from 0.190 g/cc to 0.230 g/cc,
(d) a melt index from 0.40 g/10 min to 0.45 g/10 min,
(e) a low shear viscosity (at 1 rad/second) from 31,000 Pa·s to 37,000 Pa·s, and
(f) a high shear viscosity (at 100 rad/second) from 2600 Pa·s to 3000 Pa·s.

5. A foam bead comprising:
a composition consisting of
(1) from 10 wt % to 40 wt % of (i) a peroxide-modified ethylene/α-olefin multi-block copolymer with a base ethylene/α-olefin multi-block copolymer consisting of ethylene and $C_4$-$C_8$ α-olefin comonomer having a melting point from 115° C. to 125° C. and a density from 0.865 g/cc to 0.88 g/cc, modified with from 0.10 wt % to 0.12 wt % peroxide, and (ii) optional additive selected from the group consisting of nucleators, processing aids, lubricants, stabilizers, antioxidants, foaming aids, surfactants, flow aids, viscosity control agents, coloring agents, copper inhibitors, inorganic fillers, and combinations thereof,
and
(2) from 90 wt % to 60 wt % of an ethylene/α-olefin multi-block copolymer consisting of ethylene and $C_4$-$C_8$ α-olefin comonomer having a melting point from 115° C. to 125° C. and a density from 0.865 g/cc to 0.88 g/cc;
the foam beads have
(a) a melt strength from 9 cN to 10 cN;
(b) a gel content of 0%; and
(c) a foam density from 0.230 g/cc to 0.290 g/cc,
(d) a melt index from 0.3 g/10 min to 0.4 g/10 min,
(e) a low shear viscosity (at 1 rad/second) from 38,000 Pa·s to 48,000 Pa·s, and
(f) a high shear viscosity (at 100 rad/second) from 3200 Pa·s to 3400 Pa·s.

6. A foam bead comprising:
a composition consisting of
(1) from 10 wt % to 20 wt % of (i) a peroxide-modified low density polyethylene homopolymer with a base low density polyethylene homopolymer having a melting point from 105° C. to 110° C., and a density from 0.915 g/cc to 0.920 g/cc, modified with from 0.02 wt % to 0.04 wt % peroxide and (ii) optional additive selected from the group consisting of nucleators, processing aids, lubricants, stabilizers, antioxidants, foaming aids, surfactants, flow aids, viscosity control agents, coloring agents, copper inhibitors, inorganic fillers, and combinations thereof, and
(2) from 90 wt % to 80 wt % of an ethylene/α-olefin multi-block copolymer consisting of ethylene and $C_4$-$C_8$ α-olefin comonomer and having a melting point from 115° C. to 125° C. and a density from 0.865 g/cc to 0.88 g/cc; and
the foam beads have
(a) a melt strength from 14.0 cN to 21.0 cN,
(b) a gel content of 0%,
(c) a foam density from 0.190 g/cc to 0.230 g/cc,
(d) a melt index from 0.40 g/10 min to 0.45 g/10 min,
(e) a low shear viscosity (at 1 rad/second) from 31,000 Pa·s to 37,000 Pa·s, and
(f) a high shear viscosity (at 100 rad/second) from 2600 Pa·s to 3000 Pa·s.

* * * * *